United States Patent
Tsuyuki

(10) Patent No.: US 8,708,497 B2
(45) Date of Patent: Apr. 29, 2014

(54) THREE DIMENSIONAL MEASUREMENT APPARATUS AND THREE DIMENSIONAL MEASUREMENT METHOD

(75) Inventor: Motomi Tsuyuki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 314 days.

(21) Appl. No.: 13/314,577

(22) Filed: Dec. 8, 2011

(65) Prior Publication Data

US 2012/0154540 A1 Jun. 21, 2012

(30) Foreign Application Priority Data

Dec. 20, 2010 (JP) .................................. 2010-283730

(51) Int. Cl.
*G03B 21/00* (2006.01)
*H04N 13/04* (2006.01)

(52) U.S. Cl.
CPC .................................. *H04N 13/0459* (2013.01)
USPC ................ 353/7; 356/603; 382/154; 353/121

(58) Field of Classification Search
USPC ................ 348/46, 51, 52; 356/603; 382/154; 353/7, 30, 38, 85, 121
See application file for complete search history.

(56) References Cited

U.S. PATENT DOCUMENTS

| 7,388,679 B2* | 6/2008 | Yoshino et al. ............... 356/603 |
| 2007/0025612 A1* | 2/2007 | Iwasaki et al. ............... 382/154 |
| 2007/0064246 A1* | 3/2007 | Braunecker et al. .......... 356/614 |
| 2008/0112054 A1* | 5/2008 | Seko ........................... 359/577 |

FOREIGN PATENT DOCUMENTS

JP 2007-192608 A 8/2007

* cited by examiner

*Primary Examiner* — Thai Tran
*Assistant Examiner* — Mishawn Dunn
(74) *Attorney, Agent, or Firm* — Fitzpatrick, Cella, Harper & Scinto

(57) ABSTRACT

A three dimensional measurement apparatus includes a projection unit that projects, to a measurement target object, a first pattern light including alternately arranged bright parts and dark parts and a second pattern light in which a phase of the first pattern light is shifted, and an imaging unit that images the measurement target object on which the first or second pattern light is projected. When a period of repetitions of the bright parts and the dark parts of the pattern light is one period, a range of imaging on the measurement target object by one pixel included in the imaging unit is an image distance, and the length of one period of the projected pattern light on the measurement target object surface is M times the image distance, the projection unit and the imaging unit are arranged to satisfy "$2 \times N - 0.2 \leq M \leq 2 \times N + 0.2$ (where N is not less than 2)".

4 Claims, 5 Drawing Sheets

EXPANDED TO FIG. 1B

THREE DIMENSIONAL MEASUREMENT APPARATUS AND THREE DIMENSIONAL MEASUREMENT METHOD

BACKGROUND OF THE INVENTION

1. Field of the Invention

The present invention relates to a three dimensional measurement apparatus and a method using a space encoding method for generating spatial modulation by projecting pattern lights including bright parts and dark parts arranged at an arbitrary width.

2. Description of the Related Art

In a well known measurement method in three dimensional measurement, a projection apparatus and an imaging apparatus are arranged in a known relationship. The projection apparatus projects pattern lights to a subject, and the imaging apparatus images the subject. The principle of triangulation is used based on the relationship between the projection apparatus and the imaging apparatus to calculate the distance to the subject. For example, there is a method of three dimensional measurement as in Japanese Patent Laid-Open No. 2007-192608. In the method, a first bright and dark pattern light including bright parts and dark parts alternately arranged at an arbitrary width and a second bright and dark pattern light in which the phase of the first bright and dark pattern light is shifted are projected. Tone distributions of photographed images are acquired, and positions of intersections between the first and second pattern lights on the imaging element are calculated.

It is fundamental in ranging to calculate the positions on the imaging element of the intersections calculated from the first and second pattern lights. It is more important to correctly calculate intersection distances of the first and second bright and dark pattern lights than calculate absolute values of the intersection positions. This is because although the absolute values of the intersections are necessary to calculate the absolute position of the specimen, the shape of the specimen is mainly measured in the three dimensional measurement, and in that case, it is only necessary to accurately calculate the relative positional relationship between the intersections. The measurement of the absolute position of the specimen can be attained by preparing a known index of the absolute position and measuring, i.e. calibrating, the relative relationship between the index and the specimen.

In a general intersection detection method, the tone distributions of the first and second bright and dark pattern lights on the imaging element are sampled by imaging pixels, and straight line approximation is applied to the sampling points of the pattern lights to calculate the intersections. When a period of the patterns projected to the measurement target object is sampled by relatively few imaging element pixels, the intersections include sampling errors due to the straight line approximation if the intersections are calculated by the conventional method. Therefore, there are errors in the intersection distances if the intersection distances are calculated from the intersections.

If a period of the pattern lights is sampled by many pixels of the imaging element, the errors in the intersections and the errors in the intersection distances can be reduced. However, a high-resolution imaging element is necessary, and this leads to an increase of the apparatus size and cost.

SUMMARY OF THE INVENTION

In view of the problem, an embodiment of the present invention provides a three dimensional measurement apparatus and a method capable of accurate three dimensional measurement even if sampling per period of pattern lights is performed by a small number of pixels of an imaging element.

According to one aspect of the present invention, there is provided a three dimensional measurement apparatus comprising: a projection unit that projects, to a measurement target object, a first pattern light including alternately arranged bright parts and dark parts and a second pattern light in which a phase of the first pattern light is shifted; an imaging unit that images the measurement target object, on which the first or second pattern light is projected, as image data; and a calculation unit that calculates a three dimensional position by calculating intersection positions of tone values from tone values of the image data of the first pattern light and the image data of the second pattern light obtained by the imaging unit, wherein when a period of repetitions of the bright parts and the dark parts of the first or second pattern light is one period, a range of imaging on the measurement target object surface by one pixel included in the imaging unit is an image distance, and the length of one period of the projected first pattern light or second pattern light on the measurement target object surface is M times the image distance, the projection unit and the imaging unit are arranged to satisfy $2 \times N - 0.2 \leq M \leq 2 \times N + 0.2$, where N is an integer value equal to or greater than 2.

Also, according to another aspect of the present invention, there is provided a three dimensional measurement method by a three dimensional measurement apparatus, the apparatus comprising: a projection unit that projects, to a measurement target object, a first pattern light including alternately arranged bright parts and dark parts and a second pattern light in which a phase of the first pattern light is shifted; and an imaging unit that images the measurement target object on which the first or second pattern light is projected, the method comprising: a first acquisition step by a first acquisition unit acquiring first image data by causing the projection unit to project the first pattern light to cause the imaging unit to image the measurement target object; a second acquisition step by a second acquisition unit acquiring second image data by causing the projection unit to project the second pattern light to cause the imaging unit to image the measurement target object; and a calculation step by a calculation unit calculating a three dimensional position by calculating intersection positions of tone values of the first pattern light in the first image data and tone values of the second pattern light in the second image data, wherein in the first and second acquisition steps, when a period of repetitions of the bright parts and the dark parts of the first or second pattern light is one period, a range of imaging on the measurement target object by one pixel included in the imaging unit is an image distance, and the length of one period of the projected first pattern light or second pattern light on the measurement target object surface is M times the image distance, the projection unit and the imaging unit are arranged to satisfy $2 \times N - 0.2 \leq M \leq 2 \times N + 0.2$, where N is an integer value equal to or greater than 2.

Further features of the present invention will become apparent from the following description of exemplary embodiments with reference to the attached drawings.

DESCRIPTION OF THE EMBODIMENTS

An example of a preferred embodiment of the present invention will now be described with reference to the attached drawings.

Figure 1A:
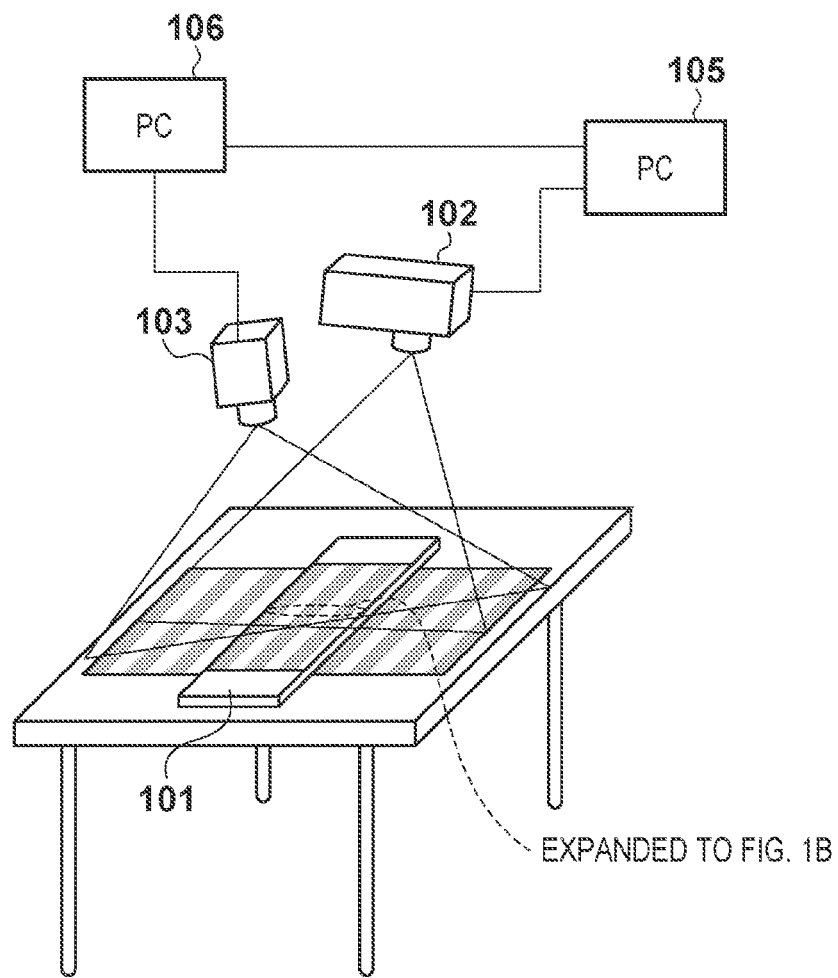
FIGS. 1A and 1B are diagrams showing a basic configuration of a three dimensional measurement apparatus according to an embodiment.

FIG. 1A is a diagram showing an example of configuration of a three dimensional measurement apparatus according to the embodiment. In FIG. 1A, reference numeral 101 denotes a measurement target object, 102 denotes a projector as an example of a projection apparatus, and 103 denotes a CCD camera as an example of an imaging apparatus. Reference numeral 105 denotes a computer (hereinafter, PC 105) that inputs an image (pattern to be projected) to the projector 102, and 106 denotes a computer (hereinafter, PC 106) that acquires tone values of image data imaged by the CCD camera 103 to calculate the position of the measurement target object. The PC 105 and the PC 106 are connected to be able to communicate each other. It is obvious that the PC 105 and the PC 106 can be realized by one computer.

Figure 1B:
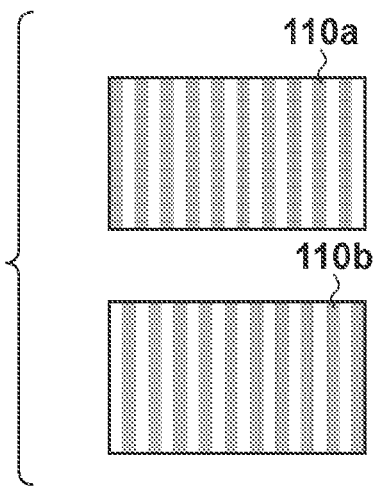

FIG. 1B shows an example of pattern lights used in the present embodiment. A first pattern light including alternately arranged bright parts and dark parts and a second pattern light in which the phase of the bright parts and the dark parts of the first pattern light is shifted are used in the present embodiment. A first bright and dark pattern light 110a is an example of the first pattern light, and a second bright and dark pattern light 110b in which the phase of the first bright and dark pattern light 110a is shifted is an example of the second pattern light. The first and second pattern lights are not limited to the illustrated examples, and any pattern lights that satisfy the requirements described below can be used.

The PC 105 and the PC 106 calculate the position of the measurement target object 101. In a first acquisition process, the PC 105 projects the first bright and dark pattern light 110a to the projector 102, and the PC 106 causes the CCD camera 103 to image the measurement target object 101, on which the first bright and dark pattern light 110a is projected, to acquire first image data. In the following second acquisition process, the PC 105 projects the second bright and dark pattern light 110b to the projector 102, and the PC 106 causes the CCD camera 103 to image the measurement target object 101, on which the second bright and dark pattern light 110b is projected, to acquire second image data.

In this way, the CCD camera 103 images a luminance distribution on the measurement target object 101, on which the first bright and dark pattern light 110a and the second bright and dark pattern light 110b are projected through the projector 102, and digital image data is imported to the PC 106. Hereinafter, values of the image data of the first and second bright and dark pattern lights will be called tone values. The three dimensional measurement apparatus calculates the intersection positions of the tone values as described below based on the tone values of the image data (first image data) of the first bright and dark pattern light and the tone values of the image data (second image data) of the second bright and dark pattern light obtained by the CCD camera 103. A three dimensional position is calculated based on the calculated intersection positions.

If the tone values of the first and second bright and dark pattern lights 110a and 110b are connected along a CCD pixel column in the first and second image data, lines connecting the tones intersect as described later in FIG. 3. It is preferable that the direction along the CCD pixel column is a direction orthogonal to the bright and dark alignment in the bright and dark pattern light.

Figure 2:
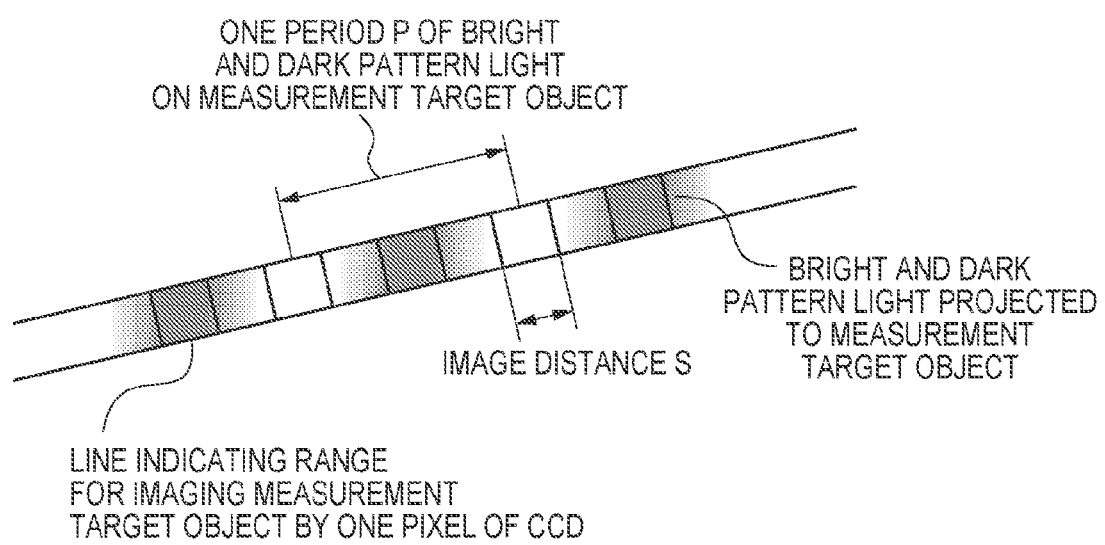
FIG. 2 is a diagram illustrating a relationship between bright and dark pattern lights on a measurement target object surface and pixels of a CCD.

FIG. 2 is an expanded view of part on the measurement target object 101 shown in FIG. 1A and illustrates the relationship between the bright and dark pattern light projected to the measurement target object and the CCD pixels. In FIG. 2, solid lines show ranges imaged by the pixels of the CCD camera 103 on the measurement target object. If a range imaged by one pixel of the CCD camera 103 on the measurement target object 101 is an image distance S, and a period (distance) of the bright and dark pattern light projected on the measurement target object 101 is P, P=M×S (M>0) is satisfied. In the present embodiment, the projector 102 and the CCD camera 103 are constituted so that M=4 (even), i.e. P=4×S, is satisfied.

Figure 3:
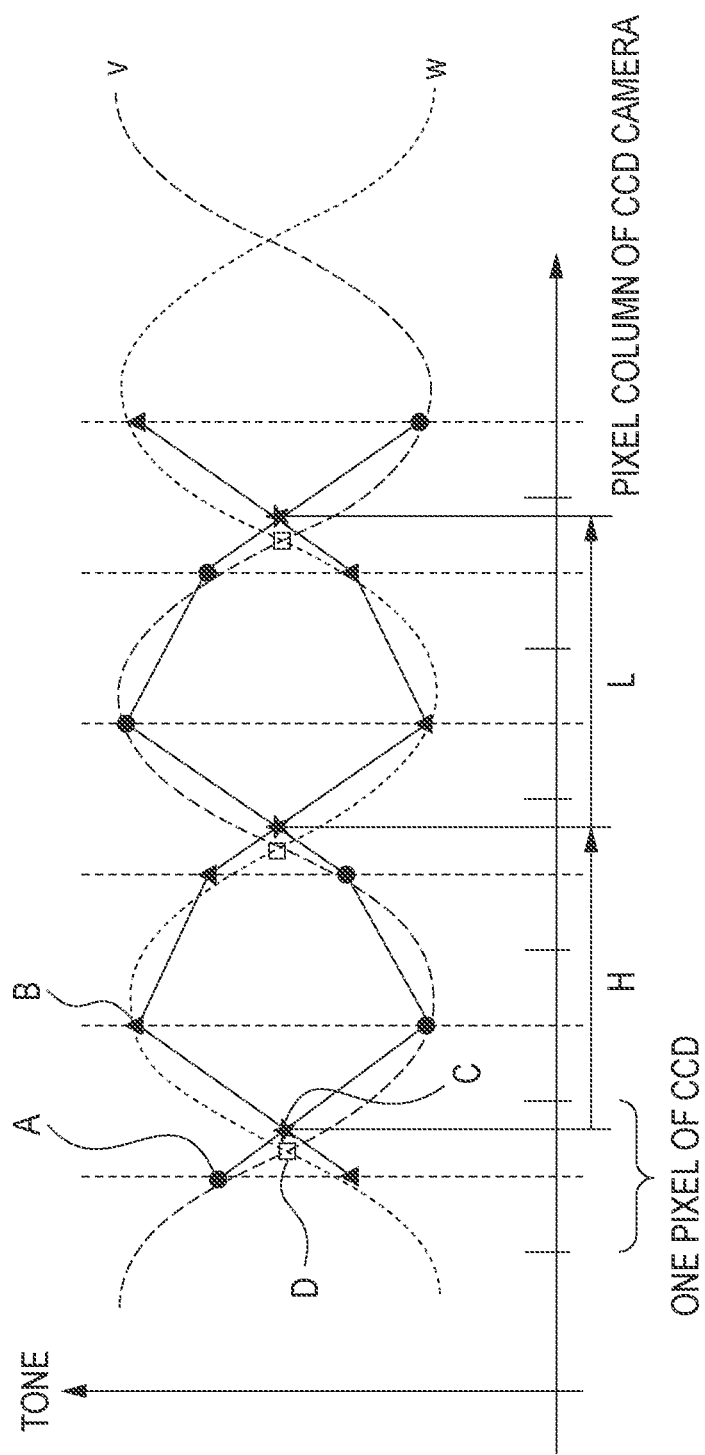
FIG. 3 is a diagram illustrating tone values acquired from image data obtained by setting the number of pixels of the CCD in a period of the bright and dark pattern lights to an even number.

FIG. 3 shows a state after imaging under the first bright and dark pattern light 110a and the second bright and dark pattern light 110b, acquiring the tone values from the image data, and detecting boundaries of the tones from the first and second bright and dark pattern lights. Curves V and W denote intensity distributions on the imaging element of the first and second bright and dark pattern lights projected to the measurement target object 101, and D (white rectangles) denotes a sequence of intersections between the intensity distributions V and W. Points A (black circles) and points B (black triangles) denote point sequences of tone distributions obtained by sampling the intensity distributions V and W by imaging pixels, respectively.

Points C (black stars) denote a point sequence formed by intersections between a line obtained by connecting the point sequence A by a straight line and a line obtained by connecting the point sequence B by a straight line. In the present embodiment, since a period of the bright and dark pattern lights is sampled by even pixels, i.e. four pixels, of the imaging element, the true value of the intersection distance is half the four pixels, or 2.0. Even if the points D and C are different, the intersection distance obtained from the point C is the true value, or 2.0, as a result of sampling a period of the bright and dark pattern lights by even pixels of the imaging element as in the present embodiment.

The error amount of each intersection distance can be reduced by forming a period of the bright and dark pattern lights on the surface of the measurement target object 101 to be M times (M is even) the image distance on the surface of the measurement target object 101. Although it is difficult to accurately set the value of M to be an integer in the implementation, accurate detection of intersection positions is possible if M is an even value ±0.2. More specifically, when the number of sampling is M, the intersection distances can be close to the true value by arranging the measurement target object 101, the projector 102, and the CCD camera 103 to satisfy $$2 \times N - 0.2 \leq M \leq 2 \times N + 0.2 \text{ (}N\text{: integer value equal to or greater than 2)} \quad \text{Expression (1)}$$

The accurate calculation of the intersection distances allows accurate detection of the intersection positions, and highly accurate three dimensional measurement can be further realized.

Figure 4:
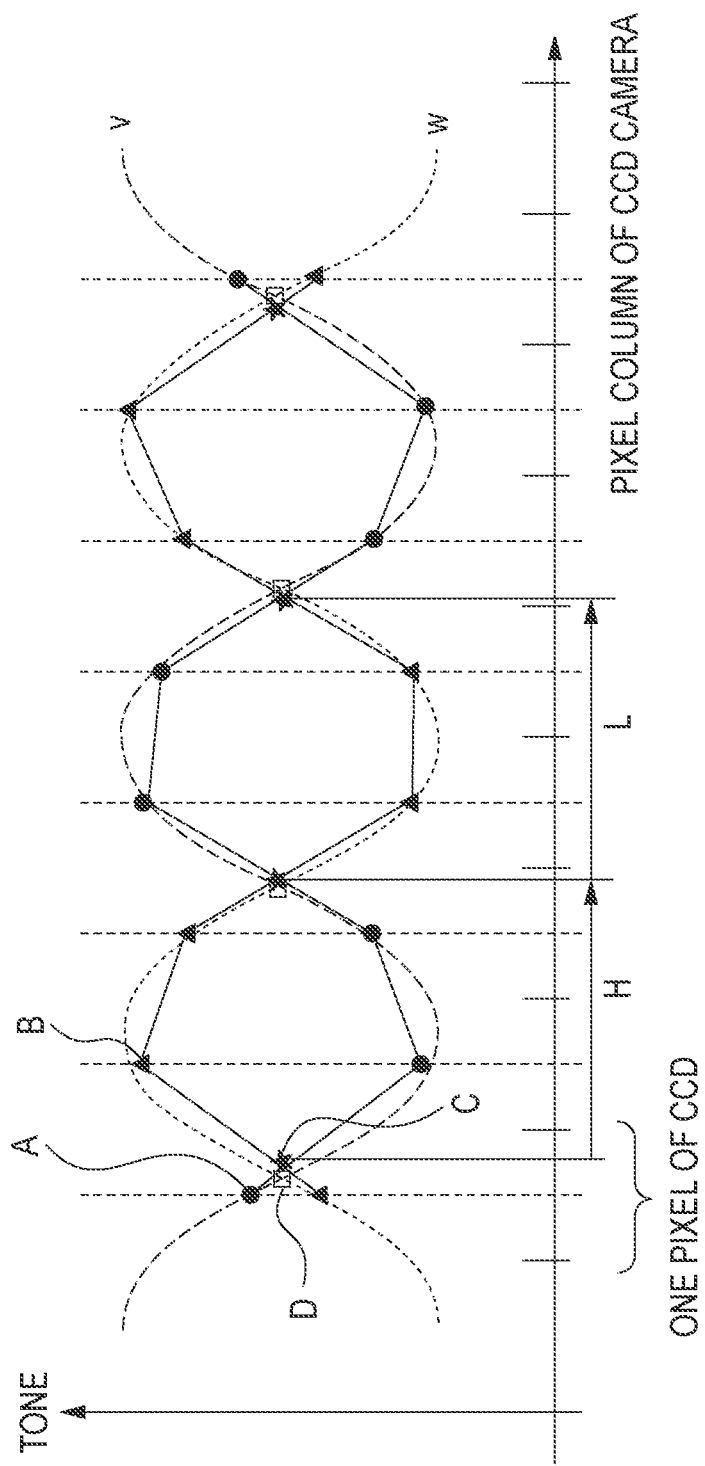
FIG. 4 is a diagram showing an example when a condition of the embodiment is not satisfied.

FIG. 4 shows an example in which a period of the bright and dark pattern lights on the measurement target object surface is not an even multiple of the image distance on the measurement target object surface. In the example of FIG. 4, M=4.5, and a period of the bright and dark pattern lights projected from the projector 102 is 4.5 times the image distance S (P=4.5×S) of the CCD camera 103. In this way, if the intersection distances are calculated from the tone values sampled by imaging when the condition of Expression (1) is not satisfied, the intersection distances are significantly out of the true value, and it is difficult to accurately detect the intersection positions.

Figure 5:
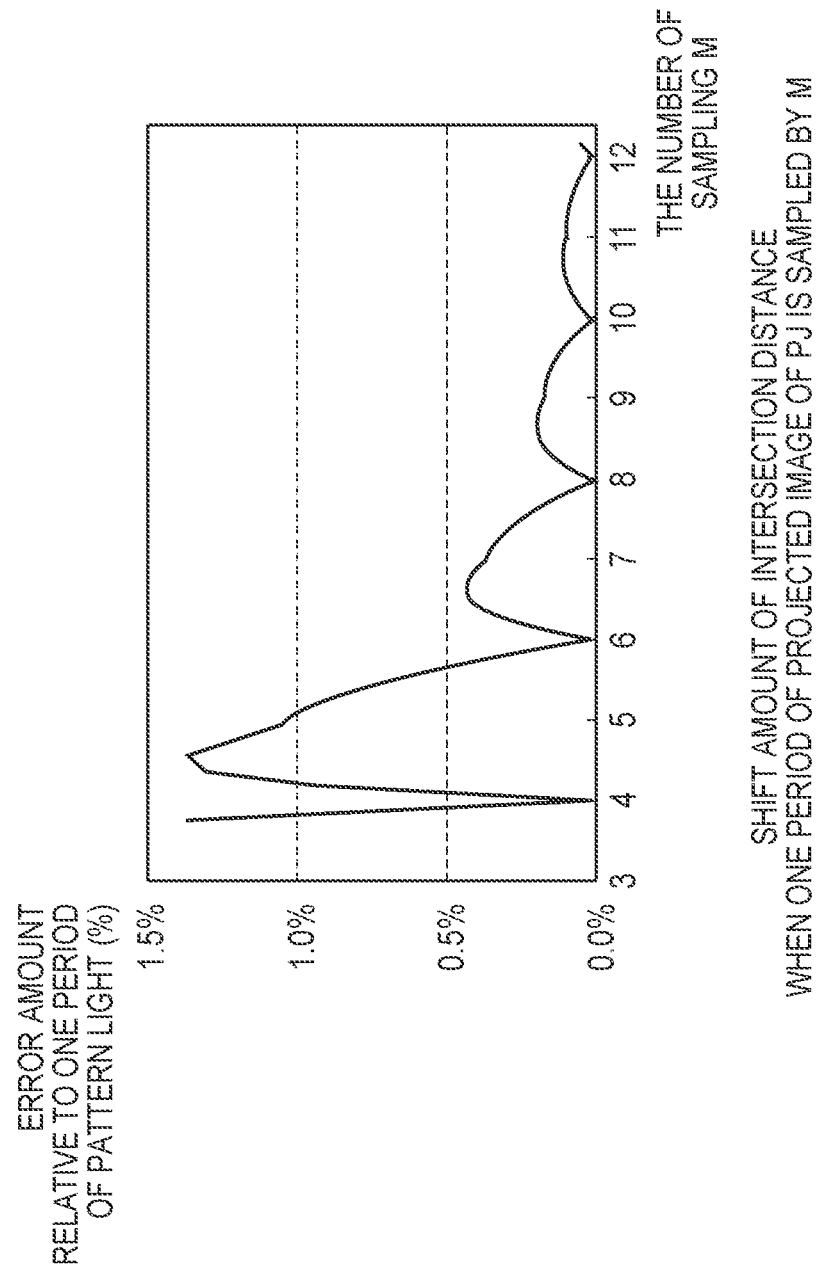
FIG. 5 is a diagram showing error amounts of intersection distances when a period of the bright and dark pattern lights on the measurement target object surface is sampled by pixels of a CCD camera.

FIG. 5 shows the result of the calculation of error amounts of the intersection distances when a period of the bright and dark pattern lights projected to the measurement target object is sampled by M pixels of the imaging element. The abscissa denotes the number of sampling (M) per period of the bright and dark pattern lights, and the ordinate denotes error amounts (unit: %) generated, by sampling, from the intersection distances calculated from the three dimensional measurement relative to the width of a period of the bright and dark pattern lights. Values close to the true value can be acquired for the intersection distances if the number of sampling M satisfies Expression (1), and the three dimensional measurement can be accurately detected. If the number of sampling M is out of Expression (1), the acquired intersection distances are out of the true value, and it is difficult to accurately detect the three dimensional measurement.

Particularly, if the intersection distances between adjacent intersections are calculated from the three dimensional measurement when the number of sampling M satisfies $2 \times N - 0.1 \leq M \leq 2 \times N + 0.1$ (N: integer value equal to or greater than 2),      Expression (2)

the intersection distances calculated at each section are closer to the true value, and an accurate position of the measurement object can be calculated.

If the number of sampling M is greater than 10, a period of the projected image of the projector 102 is imaged by many CCD pixels. Therefore, the greater the value of M, the smaller the error amount of each intersection distance even if Expression (1) is not satisfied. However, if the number of sampling M is 10 or less, the errors of the intersection distances are large unless the condition of Expression (1) or (2) is satisfied, and the values are out of the true value. Therefore, the position detection accuracy can be improved, and the three dimensional measurement can be accurately performed by constituting the projection apparatus and the imaging apparatus so that M of Expression (1) or (2) satisfies 10 or less.

As described, according to the present embodiment, the projection apparatus and the imaging apparatus are constituted so that the width of a period of the bright and dark pattern lights projected to the measurement target object is set to image the measurement target object by about an even number of pixels (the number of sampling) of the imaging element of the imaging unit.

When the tone values are acquired from the digital image data obtained by the imaging apparatus imaging the bright and dark pattern lights, the tone values are sampled by the pixels of the imaging element. When the tone values acquired from the images of the first bright and dark pattern light and the second bright and dark pattern light are used to detect the boundaries of the bright and dark pattern lights, sampling errors caused by the straight line approximation of the sampling are generated at the detected boundary positions. As a result, there are errors in the intersection distances if the intersection distances are calculated from the intersections. Therefore, the intersection distances can be close to the true value, and accurate three dimensional measurement is possible in the present embodiment by setting the width of a period of the bright and dark pattern lights projected to the measurement target object close to an even multiple of the width for imaging the measurement target object by one pixel of imaging element.

According to the present invention, the distances between the intersections can be accurately calculated, and accurate three dimensional measurement is possible by setting the number of sampling close to an even number.

While the present invention has been described with reference to exemplary embodiments, it is to be understood that the invention is not limited to the disclosed exemplary embodiments. The scope of the following claims is to be accorded the broadest interpretation so as to encompass all such modifications.

This application claims the benefit of Japanese Patent Application No. 2010-283730, filed Dec. 20, 2010, which is hereby incorporated by reference herein in its entirety.

What is claimed is:

1. A three dimensional measurement apparatus comprising:
    a projection unit that projects, to a measurement target object, a first pattern light including alternately arranged bright parts and dark parts and a second pattern light in which a phase of the first pattern light is shifted;
    an imaging unit that images the measurement target object, on which the first or second pattern light is projected, as image data; and
    a calculation unit that calculates a three dimensional position by calculating intersection positions of tone values from tone values of the image data of the first pattern light and the image data of the second pattern light obtained by said imaging unit, wherein
    when a period of repetitions of the bright parts and the dark parts of the first or second pattern light is one period, a range of imaging on the measurement target object surface by one pixel included in said imaging unit is an image distance, and the length of one period of the projected first pattern light or second pattern light on the measurement target object surface is M times the image distance, said projection unit and said imaging unit are arranged to satisfy $2 \leq N - 0.2 \leq M \leq 2 \times N + 0.2$, where N is an integer value equal to or greater than 2.

2. The three dimensional measurement apparatus according to claim 1, wherein
the N is an integer value equal to or smaller than 10.

3. The three dimensional measurement apparatus according to claim 1, wherein
the M satisfies $2 \times N - 0.1 \leq M \leq 2 \times N + 0.1$.

4. A three dimensional measurement method by a three dimensional measurement apparatus, the apparatus comprising:
    a projection unit that projects, to a measurement target object, a first pattern light including alternately arranged bright parts and dark parts and a second pattern light in which a phase of the first pattern light is shifted; and
    an imaging unit that images the measurement target object on which the first or second pattern light is projected, the method comprising:

a first acquisition step by a first acquisition unit acquiring first image data by causing said projection unit to project the first pattern light to cause said imaging unit to image the measurement target object;

a second acquisition step by a second acquisition unit acquiring second image data by causing said projection unit to project the second pattern light to cause said imaging unit to image the measurement target object; and a calculation step by a calculation unit calculating a three dimensional position by calculating intersection positions of tone values of the first pattern light in the first image data and tone values of the second pattern light in the second image data, wherein in said first and second acquisition steps, when a period of repetitions of the bright parts and the dark parts of the first or second pattern light is one period, a range of imaging on the measurement target object by one pixel included in said imaging unit is an image distance, and the length of one period of the projected first pattern light or second pattern light on the measurement target object surface is M times the image distance, said projection unit and said imaging unit are arranged to satisfy $2 \times N - 0.2 \leq M \leq 2 \times N + 0.2$, where N is an integer value equal to or greater than 2.

* * * * *